United States Patent [19]

Larsson

[11] Patent Number: 4,531,041

[45] Date of Patent: Jul. 23, 1985

[54] SPOT WELDING GUN

[75] Inventor: Jan Larsson, Västerås, Sweden

[73] Assignee: ASEA Aktiebolag, Västerås, Sweden

[21] Appl. No.: 464,000

[22] Filed: Feb. 4, 1983

[30] Foreign Application Priority Data

Feb. 8, 1982 [SE] Sweden ................................ 8200705

[51] Int. Cl.³ .............................................. B23K 11/10
[52] U.S. Cl. ......................................... 219/90; 219/89
[58] Field of Search ........................ 219/90, 86.25, 89; 901/42, 31

[56] References Cited

U.S. PATENT DOCUMENTS 4,410,782 10/1983 Konno et al. ......................... 219/89

FOREIGN PATENT DOCUMENTS 2255136 7/1975 France ................................... 219/90
52-30947 8/1977 Japan ..................................... 219/90

*Primary Examiner*—Roy N. Envall, Jr.
*Assistant Examiner*—Catherine M. Sigda
*Attorney, Agent, or Firm*—Watson, Cole, Grindle & Watson

[57] ABSTRACT

A spot welding gun adapted for use in robotic welding in which the electrode holding arms of the gun are each turnably journalled on an attachment means. One of the electrode holding arms or an operating lever thereof supports a cam member with a cam surface thereon. A pressure roller acts against said cam surface during transport of the welding gun between welding points and thereby holds each electrode holding arm in a respective fixed position relative to the attachment means.

10 Claims, 4 Drawing Figures

SPOT WELDING GUN

TECHNICAL FIELD

This invention relates to a scissor type spot welding gun which is particularly adapted for use with a welding robot.

A spot welding gun of this type comprises two arms, each of which serves as an electrode holder. During welding, these arms are moved towards an assembly of sheets to be spot welded by a common drive device connected to the arms. During transportation from one spot welding location to another, the electrodes of the welding gun must be held apart at a suitable distance from each other and in a pre-determined and well-defined position in relation to an attachment on the carrying "wrist" of the robot so that the electrodes can approach the next welding spot with one welding electrode on each side of the assembly of sheets to be welded and with each spaced a suitable distance from the assembly.

DISCUSSION OF PRIOR ART

Heretofore, for this purpose, an operating cylinder has been used which has been connected to the attachment and to one of the two arms. By supplying working fluid to the operating cylinder, the piston of the operating cylinder can be made to assume one of its limit positions, thereby fixing the arms of the welding gun in a specified position in relation to the gun-carrying attachment of the robot.

One object of the present invention is to eliminate drawbacks in the prior art designs of robotic welding guns, which have imposed certain restrictions on the range of movements possible with the arms. In some cases, this has led to the gun-carrying arm of the robot being subjected to considerable forces or to sheets, which are about to be welded, being moved out of their intended position in a welding fixture and thereby causing the formation of imperfect welds. By virtue of the present invention, these drawbacks are removed while simultaneously achieving advantages which facilitate the programming of robots.

BRIEF DISCLOSURE OF INVENTION

According to the invention, a cam surface and a pressure element acting thereon are used to fix the electrode holders in a specified position in relation to the attachment during transport of the open welding gun. An operating device in or on the attachment of the welding gun electrode holders causes a displacement of the pressure element towards the cam surface or the cam surface towards the pressure element. Suitably, the cam surface is concave and the pressure element is a roller which can be operated towards and away from the cam surface by means of a suitable remotely actuated drive device. The cam surface is suitably V-shaped and preferably is connected to one of the electrode holders of the welding gun. The pressure element is suitably journalled in a holder at one end of the piston rod of an operating cylinder. This operating cylinder is conveniently arranged in the attachment of the welding gun. The cylinder may comprise a pressure spring for operation in one direction, preferably in a direction urging the pressure element towards the cam surface. In the opposite direction, movement of the pressure element away from the cam surface may be caused by a suitable pressurization of the cylinder by a pressure medium supplied thereto.

BRIEF DESCRIPTION OF DRAWINGS

The invention will be described in greater detail, by way of example, with reference to the accompanying drawings, in which.

DESCRIPTION OF PREFERRED EMBODIMENT

Figure 1:
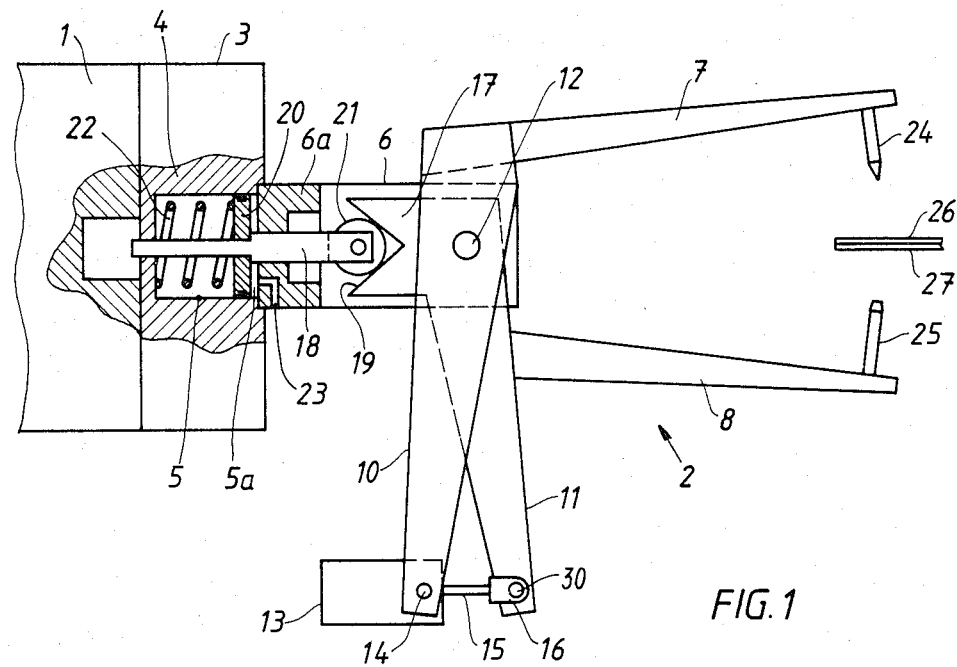
FIG. 1 shows a welding gun in its transport or open condition.

In the drawings, the numeral 1 designates an attachment on the wrist of a robot and the numeral 2 a welding gun. Besides carrying the welding gun 2, the attachment 1 also carries a contact device 3. The welding gun 2 comprises an attachment 4 which is joined to the attachment 1 of the robot and is provided with a cylinder 5. Electrode holding arms 7 and 8 of the welding gun 2 are supported by lever arms 10 and 11 which are turnably journalled on a shaft 12 in a bifurcated member 6. The lever arm 10 to which the arm 7 is attached comprises parallel arm portions 10a and 10b (see FIG. 3) disposed on opposite sides of the arm 7. An operating cylinder 13 for opening and closing the electrode holding arms 7 and 8 of the welding gun 2 is turnably journalled by means of pivots 14 in the arm portions 10a and 10b and between these. The piston rod 15 of the cylinder 13 is pivotally connected to the lever arm 11 by means of a bracket 16 and a pivot 30. The lever arm 11 is provided with a cam plate 17 defining a V-shaped cam surface 19.

The inner portion of the bifurcated member 6 forms the end closure 6a of the cylinder 5 and slidably receives a piston rod 18, which is connected to a piston 20 of the cylinder 5, and supports a pressure roller 21 designed to coact with the cam surface 19. The cylinder 5 encloses a helical spring 22 which influences the piston 20 and thereby the roller 21 in a direction towards the cam surface 19. Through a channel 23 in the end closure 6a, the space 5a in the cylinder 5 can be put into communication with a pressure medium source (not shown) so that the pressure roller 21 can be moved away from the cam surface 19. The arms 7 and 8 carry welding electrodes 24 and 25. The sheets to be spot welded together are designated 26 and 27.

In the transport position, the welding gun is held in its open condition by the operating cylinder 13, as shown in FIG. 1. The cylinder space 5a is of small volume and contains pressure medium at low pressure. The spring 22 generates the dominant force on the piston rod 18 and presses the roller 21 against the cam surface 19, whereby the welding gun electrode holding arms 7 and 8 will be held fixed apart, each in a specified position relative to the attachment 1 on the carrying wrist of the robot. The cam surface 19 is shaped so that there can be no relative movement between said electrode holding arms 7 and 8 when the pressure element 21 is pressed with maximum generated pressure against the cam surface. When the welding gun has been brought to the desired new welding position, pressure medium is supplied to the cylinder space 5a, so that the pressure roller 21 is moved to the left, against the urging of the spring 22, to the position shown in FIG. 2. The arms 7 and 8 of the welding gun can now turn freely about the shaft 12. At the same time, the arms 7 and 8 are urged together by the operating cylinder 13 so that the electrodes 24, 25 are pressed against the sheets 26 and 27 and the required welding current is supplied to the arms 7 and 8, from the contact device 3 via the flexible links 7a and 8a.

Figure 2:
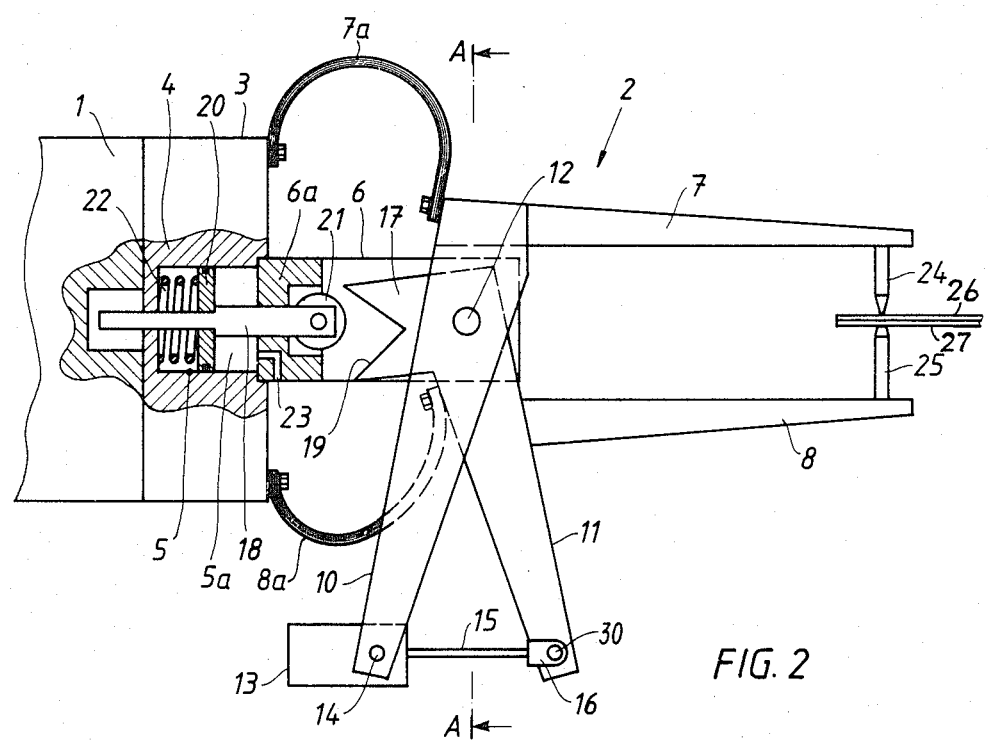
FIG. 2 shows the welding gun of FIG. 1 in its welding position.
Figure 3:
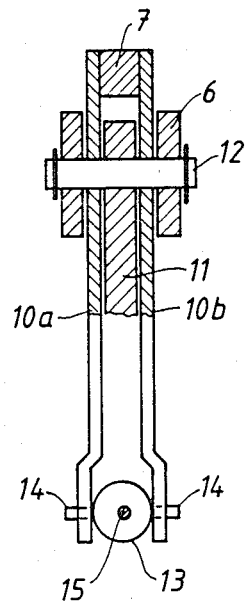
FIG. 3 shows a section taken on the line A—A of FIG. 2.
Figure 4:
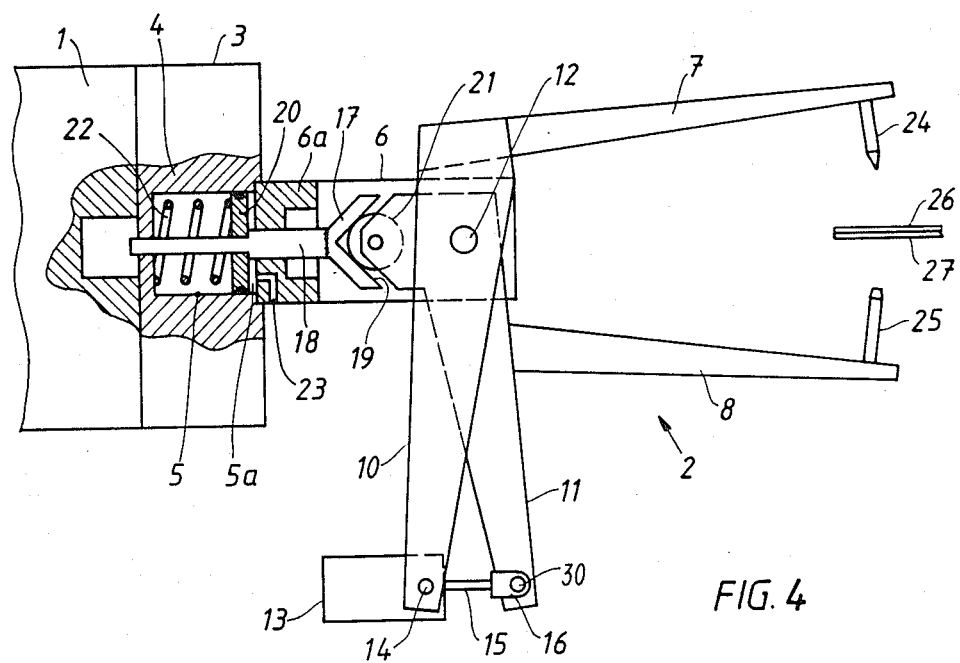
FIG. 4 shows another embodiment of a welding gun in its transport or open condition.

Although a V-shaped cam surface 19 is shown in FIGS. 1 and 2, other shapes of cam surface can be used provided it locks the arm 7, relative to the member 6 when the pressure element 21 is urged against it. A roller is not essential for the pressure element 21. The invention may be varied in other ways from the embodiment illustrated, in FIGS. 1–3 provided all such modifications fall within the scope of the following claims. Thus, for example the cam member can be mounted on the piston rod 18 and the roller on the lever arm 11 as shown in FIG. 4.

What is claimed is:

1. A scissor-type spot welding gun for use with a robot, said spot welding gun comprising
   an attachment means capable of connection to the arm of a robot,
   first and second electrode-holding arms,
   mounting means supporting said first and second electrode-holding arms on said attachment means and permitting said first and second electrode-holding arms to pivot relative to one another between an open relative positioning and a closed relative positioning,
   a first operating means connected between said first and second electrode-holding arms, said first operating means applying a bias on said first and second electrode-holding arms to pivot them into their closed relative positioning, and
   a second operating means cooperable with said first and second electrode-holding arms to cause them to pivot relative to one another into their open relative positioning, said second operating means including
   a cam member on one of said first and second electrode-holding arms, said cam member being movable with its associated electrode-holding arm and providing an open concave cam surface,
   an actuation means movably mounted in said attachment means so as to be movable toward and away from said cam member, said actuation means including an abutment element for contacting the cam surface of said cam member, and
   a pressure means for moving said actuation means towards said cam member such that the abutment element thereon will contact the cam surface of said cam member, said actuation means, under the influence of said pressure means, being capable of moving said cam member and its associated electrode-holding arm such that said first and second electrode-holding arms will pivot relative to one another against the bias of said first operating means and into their open relative positioning.

2. The spot welding gun as defined in claim 1, wherein said abutment element comprises a roller.

3. The spot welding gun as defined in claim 2, wherein said attachment means includes a channel therein, wherein said actuation means includes a rod which mounts said roller at one end and extends into said channel and a piston which is attached to said rod at a point within said channel, and wherein said pressure means comprises a spring which abuts against said piston.

4. The spot welding gun as defined in claim 3, wherein an end closure means is mounted over said channel in said attachment means, said end closure means including an opening through which said rod sealingly slides and a passage means through which fluid can pass to push said piston against the force exerted thereon by said spring.

5. The spot welding gun as defined in claim 1, wherein said cam surface is V-shaped.

6. A scissor-type spot welding gun for use with a robot, said spot welding gun comprising
   an attachment means capable of connection to the arm of a robot,
   first and second electrode-holding arms,
   mounting means supporting said first and second electrode-holding arms on said attachment means and permitting said first and second electrode-holding arms to pivot relative to one another between an open relative positioning and a closed relative positioning,
   a first operating means connected between said first and second electrode-holding arms, said first operating means applying a bias on said first and second electrode-holding arms to pivot them into their closed relative positioning, and
   a second operating means cooperable with said first and second electrode-holding arms to cause them to pivot relative to one another into their open relative positioning, said second operating means including
   an abutment element on one of said first and second electrode-holding arms, said abutment element being movable with its associated electrode-holding arm,
   an actuation means movably mounted in said attachment means so as to be movable toward and away from said abutment element, said actuation means including a cam member providing an open concave cam surface which faces said abutment element, and
   a pressure means for moving said actuation means towards said abutment element such that the open concave cam surface of said cam member will contact said abutment element, said actuation means, under the influence of said pressure means, being capable of moving said abutment element and its associated electrode-holding arm such that said first and second electrode-holding arms will pivot relative to one another against the bias of said first operating means and into their open relative positioning.

7. The spot welding gun as defined in claim 6, wherein said abutment element comprises a roller.

8. The spot welding gun as defined in claim 7, wherein said attachment means includes a channel therein, wherein said actuation means includes a rod which mounts said cam member at one end and extends into said channel and a piston which is attached to said rod at a point within said channel, and wherein said pressure means comprises a spring which abuts against said piston.

9. The spot welding gun as defined in claim 8, wherein an end closure means is mounted over said channel in said attachment means, said end closure means including an opening through which said rod sealingly slides and a passage means through which fluid can pass to push said piston against the force exerted thereon by said spring.

10. The spot welding gun as defined in claim 6, wherein said cam surface is V-shaped.

* * * * *